United States Patent [19]
Byers et al.

[11] Patent Number: 5,473,819
[45] Date of Patent: Dec. 12, 1995

[54] PLUMB BOB STRING HOLDER

[76] Inventors: Gary L. Byers; Timothy W. Byers, both of Hwy. 93, Whitefish, Mont. 59937

[21] Appl. No.: 225,570

[22] Filed: Apr. 11, 1994

[51] Int. Cl.⁶ .................................................. G01C 15/10
[52] U.S. Cl. .................................................. 33/339; 33/392
[58] Field of Search ............................. 33/339, 413, 414, 33/392, 393, 394

[56] References Cited

U.S. PATENT DOCUMENTS

| | | | |
|---|---|---|---|
| 833,699 | 10/1906 | Starrett | 33/393 |
| 1,178,065 | 4/1916 | Craig | 33/393 |
| 1,275,735 | 8/1918 | Phillips | 33/393 |
| 1,609,777 | 12/1926 | Senez | 33/393 |
| 1,616,234 | 2/1927 | Rooney | 33/393 |
| 1,784,064 | 12/1930 | Griswold | 33/393 |
| 2,475,745 | 7/1949 | Humlegard | 33/393 |
| 2,627,124 | 2/1953 | La Rock | 33/392 |
| 2,683,937 | 7/1954 | Criswell | 33/393 |
| 4,266,347 | 5/1981 | Illgen | 33/393 |
| 5,157,843 | 10/1992 | Barcewski | 33/392 |

*Primary Examiner*—Thomas B. Will
*Attorney, Agent, or Firm*—Harry M. Cross, Jr.

[57] ABSTRACT

A plumb bob string holder comprises a molded plastic unitary structure having first and second annular rings joined together by a bridge. Each of the first and second annular rings defines a circular aperture having a diameter sufficiently large whereby a plumb bob may by passed therethrough. The bridge is wide enough whereby a plumb bob string may be wound therearound for storage. The structure is constructed and arranged whereby a user may grip and hold the structure with his/her forefinger extended through one of the first and second annular rings, his/her middle finger wrapped around the bridge, and his/her fourth and fifth fingers extended through the other of annular ring, when a plumb bob string extends downward from the structure.

8 Claims, 4 Drawing Sheets

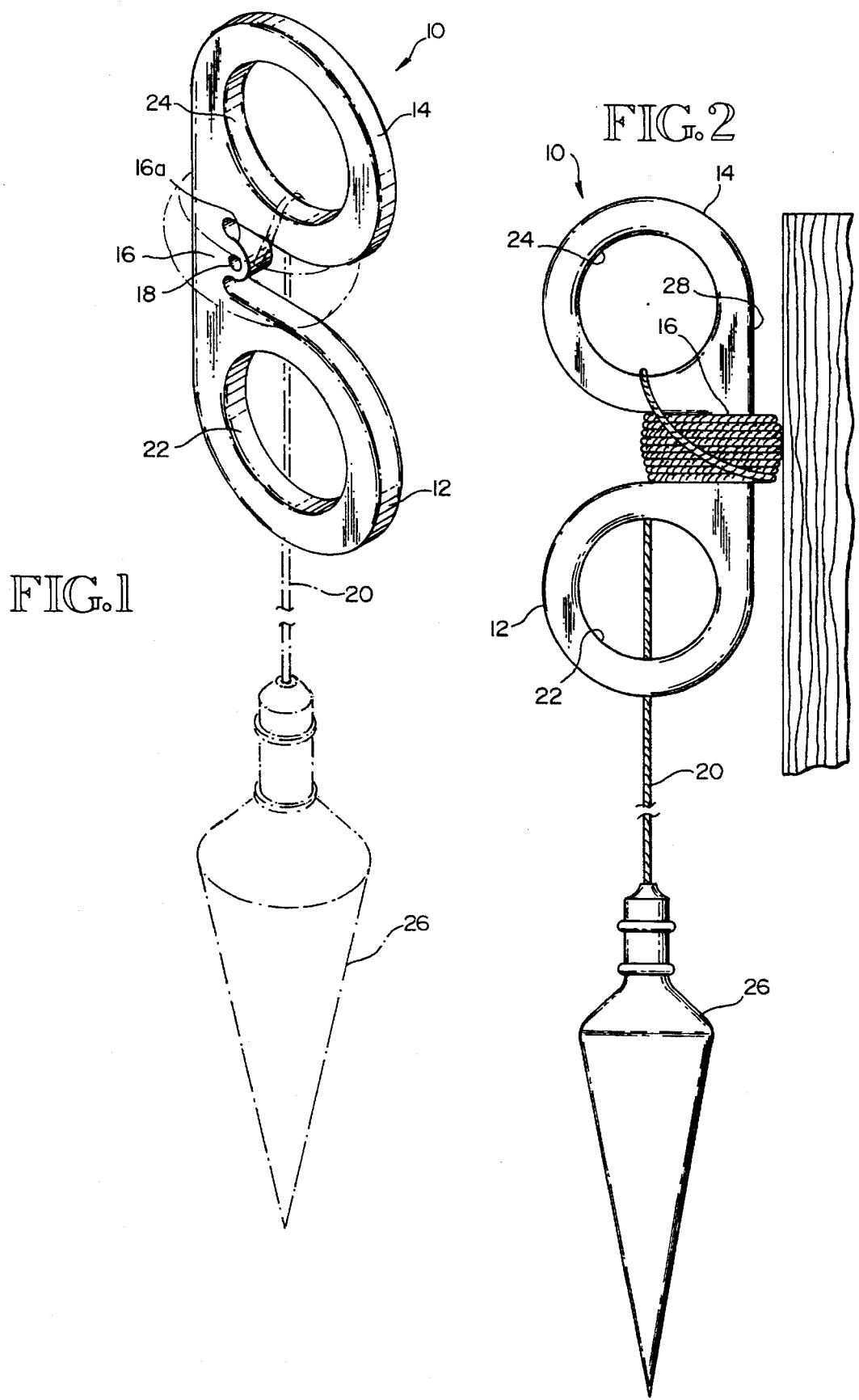

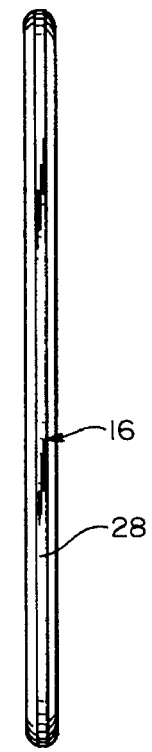
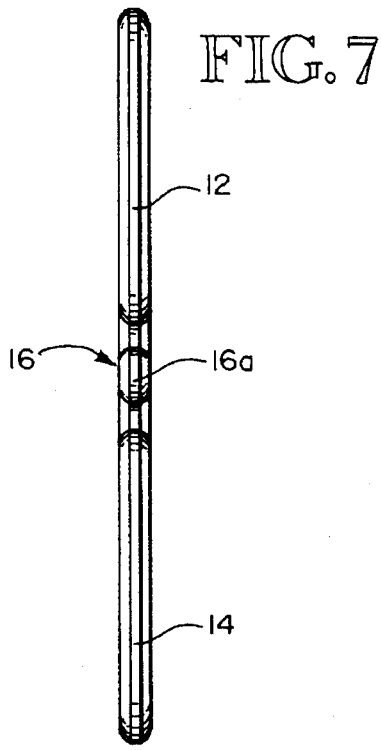
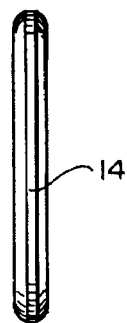
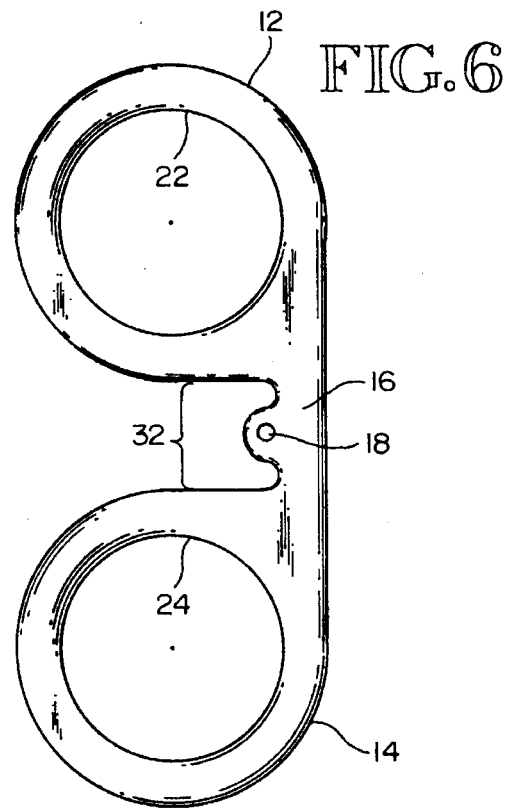

PLUMB BOB STRING HOLDER

BACKGROUND OF THE INVENTION

1. Field of the Invention

This invention relates to plumb bobs used in the surveying and construction trades and more particularly to holders for plumb bob strings.

2. Brief Description of the Prior Art

In the use of a plumb bob, how to deal with the string or line which suspends the plumb bob has been a chronic problem. During a given use of a plumb bob, there is almost always more string than is required for that particular use. In the absence of a holder, the excess string is usually left to dangle from the operator's hands. Often a simple string holder, such as a stick or rod is used to wind-up the excess string to keep it out of the way and to keep it unsnarled. A plumb bob user, when employing a string holder, will often grasp the holder and let the plumb bob hang directly from the holder. When using a simple string holder of the type described above, the holder will often inadvertently twist or rotate in the user's hand and, consequently, allow more string than is required to unwind from the holder, causing the plumb bob to descend further than is desired.

More complicated plumb bob string holders have been proposed to enable a plumb bob user to fasten the string to the holder so that no more than the desired length of string will be released for a particular use. These more complicated holders suffer from any one of a number of disadvantages. They may abrade the string, thereby shortening its life. They may be time-consuming to use, either when securing or releasing the string, or both. They may be cumbersome to hold when the user desires to suspend the plumb bob directly from the holder rather than directly from his hand. They may be complicated to manufacture and therefore uneconomical.

SUMMARY OF THE INVENTION

The plumb bob string holder of the present invention is of one piece construction, fabricable from injection-molded plastic, and therefore very economical to manufacture. It has a configuration that enables it to be conveniently and comfortably held in one hand so that a plumb bob can be suspended directly from it. It has a configuration that enables the plumb bob to be threaded through it to secure the string at a predetermined length without risk that the string might be inadvertently unwound.

In summary, the present invention comprises first and second ring means providing first and second apertures and bridge means joining the first and second ring means together. The bridge means is constructed and arranged to have a plumb bob string fastened thereto. Each of the first and second apertures are large enough that a plumb bob can be passed therethrough. And the bridge means separates the first and second ring means sufficiently whereby a plumb bob string can be wound around the bridge means between the first and second ring means.

In a preferred form of the invention, it comprises a molded plastic unitary structure having first and second annular rings joined together by a bridge. Each of the first and second annular rings defines a circular aperture having a diameter sufficiently large whereby a plumb bob may by passed therethrough. The bridge is wide enough whereby a plumb bob string may be wound therearound for storage. The structure is constructed and arranged whereby a user may grip and hold the structure with his/her forefinger extended through one of the first and second annular rings, his/her middle finger wrapped around the bridge, and his/her fourth and fifth fingers extended through the other of annular ring, when a plumb bob string extends downward from the structure. A plumb bob string is fastened to the bridge whereby the plumb bob string may be wound around the bridge for storage. A plumb bob fastened to the plumb bob string, has a size small enough that it can be inserted through either of the first and second annular rings whereby the plumb bob string will be extended through at least one of the first and second annular rings and secured against being unwound from the bridge.

BRIEF DESCRIPTION OF THE DRAWINGS

FIG. 1 is a view in perspective of the plumb bob string holder of this invention, with a plumb bob string and plumb bob shown in phantom;

FIG. 2 is a view in vertical elevation of the plumb bob string holder in use as an aid to establish a true vertical line;

FIG. 6 is a plan view of the plumb bob string holder illustrating its configuration; and FIGS. 7, 8 and 9 are, respectively, left, right and bottom edge side views of the FIG. 6 plan view.

DESCRIPTION OF THE PREFERRED EMBODIMENT

Figure 3:
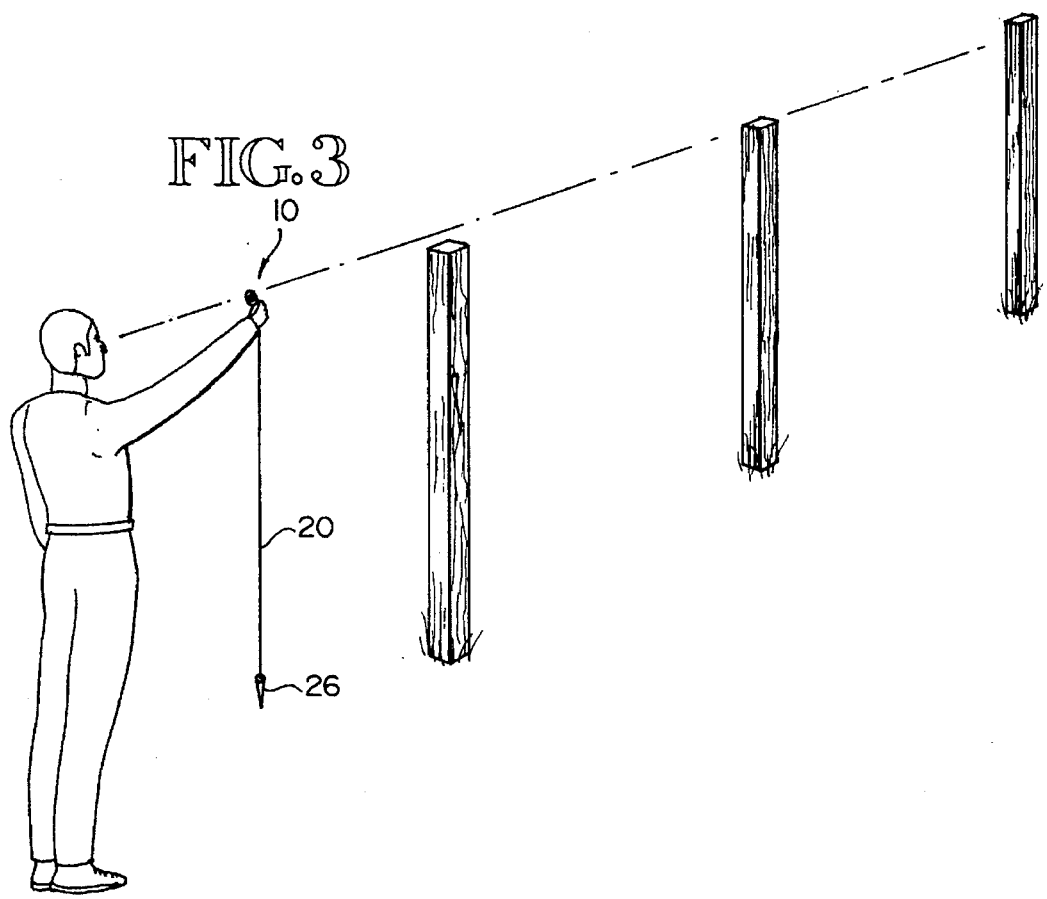
FIG. 3 is a view in perspective illustrating a user employing the plumb bob string holder of this invention as an aid in aligning a series of posts.

The plumb bob string holder 10 of this invention is preferably fabricated of injection-molded plastic in one piece. It comprises a pair of relatively thin annular rings 12, 14 connected to one another by a relatively thin bridge 16. In gross appearance, it resembles a pair of nose spectacles that have no ear pieces and that perch on the bridge of a person's nose. The bridge is provided with a transverse hole 18 through which a plumb bob string 20 is threaded and tied to itself for attachment to the holder. The circular apertures 22, 24 defined by the annular rings have a diameter large enough to enable a plumb bob body 26 to be inserted through them. The bridge between the rings is provided with an exterior straight edge 28 that extends from one ring to the other. This exterior edge is tangential to the outer circumference of the rings. At the mid-point of the bridge, the interior edge between the two rings is provided with a semicircular protrusion 16a. The transverse string hole is located at the center point of this semicircular protrusion. This protrusion enables the location of the string hole in the middle of the bridge without structurally weakening the bridge. The circumferences of the rings approach the interior edge of the bridge perpendicularly to the bridge straight edge and terminate at the interior edge of the bridge with the string hole protrusion inbetween. The gap 32 (see FIG. 6) between the rings at the interior edge of the bridge provides a channel in which the plumb bob string may be wound for storage as shown in FIGS. 1 and 2.

Figure 5:
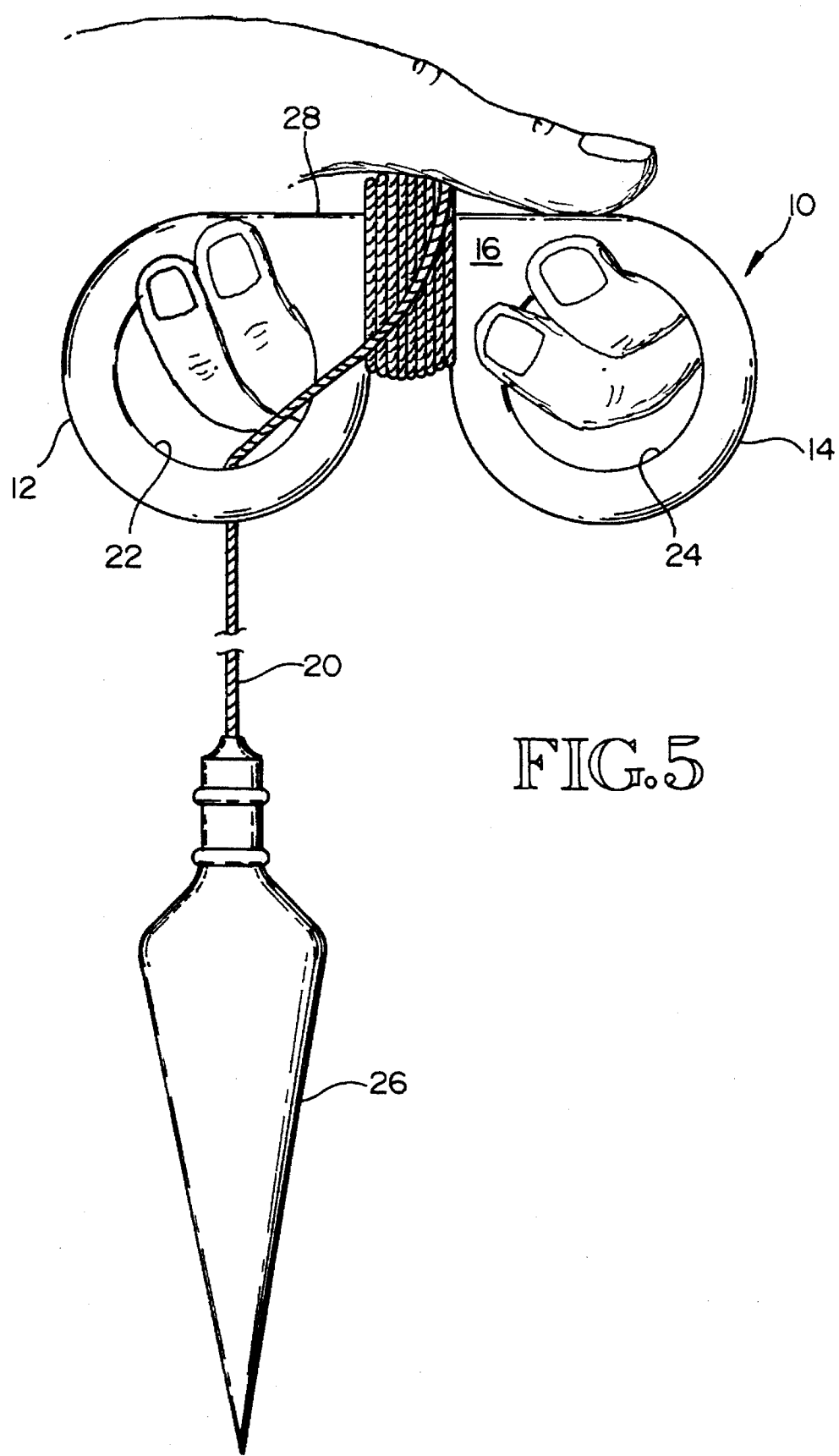
FIG. 5 is a side elevation view of a user's hand holding the plumb bob string holder in a position suitable for suspending the plumb bob for the purposes of measuring or aligning.

The plumb bob string holder may be used in a variety of ways. The string may be extended downwardly from the bridge of the holder. When the holder is gripped with the user's thumb on the exterior straight edge of the bridge and his forefinger extended through one of the rings (illustrated in FIG. 5), his ring finger either wrapped around the bridge or extended through the same ring as his forefinger and his fourth and fifth fingers extended through the other ring, the holder is balanced in the user's hand when the string extends downwardly directly from the bridge. When held in this fashion, with the string depending downwardly directly from the bridge, the holder cannot inadvertently twist or rotate and accidentally let out more string than the user intends. If the user wants to insure that the length of string that has been extended will not change, even if the holder is set aside, the user can thread the plumb bob through one of the rings (such as is shown in FIG. 5) or, even more preferably, through both of the rings (such as is shown in FIG. 1) so that the plumb bob is suspended directly from one of the rings rather than from the bridge. By extending the string through one or both rings, the string cannot be unwound from the holder beyond the length that was unwound before the string was threaded through the ring or rings.

Figure 4:
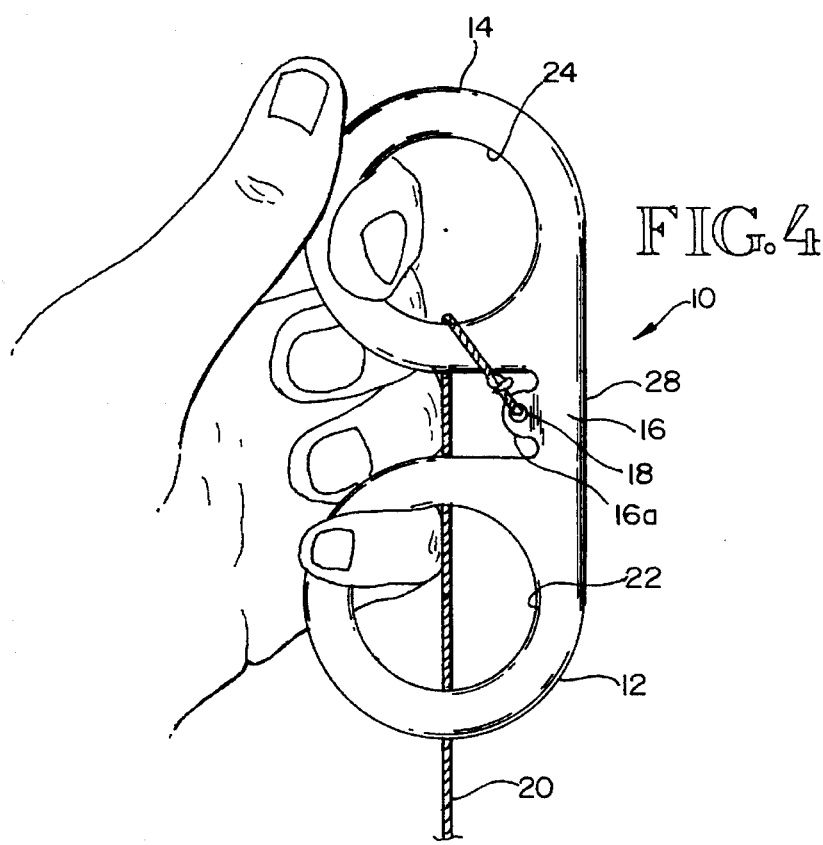
FIG. 4 is a side elevation view of a user's hand holding the plumb bob string holder for use for purposes such as are illustrated in FIG. 3.

The exterior straight edge of the holder can be used to establish a vertically line. The use can thread the plumb bob through one ring and suspend the plumb bob from that ring. The user can then position the holder so that the string so that it bifurcates the other ring by manipulating the holder relative to the string. When the other ring is bifurcated by the string, the exterior straight edge will be vertical (illustrated in FIG. 4). This feature can come in handy when aligning walls or posts, or the like (illustrated in FIGS. 2 and 3). In this use, a user's hand would grip the holder from the opposite side of the holder as illustrated in FIG. 4; opposite to the hand position illustrated in FIG. 5.

While the preferred embodiment of the invention has been described herein, variations in the design may be made. For example, the structure of the holder can be provided by means other than injection molded plastic. The structure could be provided, for example, by heavy wire shaped into the configuration illustrated in the drawings so as to provide a pair of rings joined by an intervening bridge to provide a straight edge along the outer edge of the bridge. The scope of the invention, therefore, is only to be limited by the claims appended hereto.

A preferred plumb bob string holder would be fabricated to provide an overall length of about 5.25 inches and a thickness of about 0.25 inches, an outer ring diameter of about 2.25 inches and an inner ring diameter of about 1-7/16 inches, a straight edge of about 3.25 inches along the outer edge of the bridge 16, a bridge gap between the rings 12, 14 for the plumb bob string windings of about 0.75 inches and a ring annulus width of about 3/8 inches. The holder 10 would be flat-sided, preferably, with all edges radiused. A preferred plumb bob string holder would be fabricated by injection molding of polystyrene plastic. Other plastics of suitable durability would be acceptable. A typical plumb bob used in the construction trades is a 16 oz. bob having its largest diameter to be about 1-7/16 inches. The inner ring diameter of the rings 12, 14 are preferably at least as large as the plumb bob diameter for which the holder is designed so that the string-securing feature of this invention, as shown in FIGS. 1 and 5, and the vertical-aligning feature, as shown in FIGS. 3 and 4, can be utilized. For use with plumb bobs having different diameters, the holder of this invention may be sized upward or downward relative to the plumb bob diameter selected.

When the string is looped through the holder as shown in FIG. 1, through both apertures, the plumb bob string becomes tangle proof. When the plumb bob and its holder are stored, as in a tool chest, the string cannot unravel or snarl. The closeness of the plumb bob, when the string is wound up around the holder as shown in FIG. 1, to the holder will keep the string from unraveling or falling off the holder.

The embodiments of the invention in which an exclusive property is claimed are defined as follows:

What is claimed is:

1. A plumb bob string holder comprising first and second ring means providing first and second apertures and bridge means joining the first and second ring means together for holding plumb bob string between said first and second ring means, each ring means having an exterior peripheral edge and an interior peripheral edge, each interior peripheral edge defining and completely encircling one of said apertures; said ring means being so constructed and arranged (a) that said first and second apertures are (i) large enough that a plumb bob can be passed therethrough and (ii) close enough together that a user may grasp said holder in one hand by extending the fingers of that hand through both apertures, and (b) that said first and second apertures have centers that are longitudinally aligned to one another in said holder so as to define a longitudinal axis of said holder through said centers;

said bridge means being so constructed and arranged (a) to be laterally offset from said longitudinal axis so as to be eccentric to the longitudinally-aligned centers of said first and second apertures so that said holder is asymmetrical about said longitudinal axis whereby said holder cannot inadvertently rotate in a user's hand, and (b) to provide an exterior straight edge tangential to the exterior peripheral edges of said first and second ring means and parallel to said longitudinal axis whereby said straight edge can be used to establish a vertical line when plumb bob string is extended from said holder and said holder is held by a user so as to align the plumb bob string with said longitudinal axis;

said exterior edges of said first and second ring means being so constructed and arranged with respect to one another as to provide a channel between said first and second ring means within which plumb bob string is confined when wound about said bridge means.

2. The holder of claim 1 wherein the exterior edges of said first and second ring means each has a circular exterior circumference that tangentially blends into said bridge means straight edge and that tangentially blends into a linear side wall for said channel so that said channel is defined by parallel side walls that are perpendicular to said bridge means straight edge.

3. The holder of claim 1 wherein said bridge means includes an interior edge laterally offset from said longitudinal axis so as to be eccentric to the longitudinally-aligned centers of said first and second apertures and closely spaced to said bridge means exterior edge so that said channel is provided with a substantial plumb bob string holding depth between said longitudinal axis and said interior edge, said interior edge being provided with a protrusion extending into said channel through which a string-fastening hole extends transversely, whereby the structural strength of said bridge means is unweakened by the presence of said hole.

4. The holder of claim 1 wherein the exterior edges of said first and second ring means each has a circular exterior circumference that tangentially blends into said bridge means straight edge and that tangentially blends into a linear side wall for said channel so that said channel is defined by parallel side walls that are perpendicular to said bridge means straight edge; and wherein said bridge means includes an interior edge laterally offset from said longitudinal axis so as to be eccentric to the longitudinally-aligned centers of said first and second apertures and closely spaced to said bridge means exterior edge so that said channel is provided with a substantial plumb bob string holding depth between said longitudinal axis and said interior edge, said interior edge being provided with a protrusion extending into said channel through which a string-fastening hole extends transversely, whereby the structural strength of said bridge means is unweakened by the presence of said hole.

5. A plumb bob and string holder comprising a plastic unitary structure having first and second annular rings joined together by a bridge; each of said first and second annular rings defining a completely enclosed circular aperture having a diameter sufficiently large whereby a plumb bob may by passed therethrough; said bridge being wide enough whereby a plumb bob string may be wound therearound for storage; said structure being constructed and arranged whereby a user may grip and hold said structure with his/her forefinger extended through one of said first and second annular rings, his/her middle finger wrapped around said bridge, and his/her fourth and fifth fingers extended through the other of said first and second annular rings, when a plumb bob string extends downward from said structure; a plumb bob string fastened to said bridge whereby said plumb bob string may be wound around said bridge for storage; a plumb bob fastened to said plumb bob string; said plumb bob having a size small enough that it can be inserted through either of said first and second annular rings whereby said plumb bob string will be extended through at least one of said first and second annular rings and secured against being unwound from said bridge;

said rings being so constructed and arranged that the apertures of said first and second rings have centers that are longitudinally aligned to one another so as to define a longitudinal axis of said holder through said centers;

said bridge being so constructed and arranged (a) to be laterally offset from said longitudinal axis so as to be eccentric to the longitudinally-aligned centers of said first and second ring so that said holder is asymmetrical about said longitudinal axis whereby said holder cannot inadvertently rotate in a user's hand, and (b) to provide an exterior straight edge tangential to the exterior peripheral edges of said first and second rings and parallel to said longitudinal axis whereby said straight edge can be used to establish a vertical line when plumb bob string is extended from said holder and said holder is held by a user so as to align the plumb bob string with said longitudinal axis;

said exterior edges of said first and second rings being so constructed and arranged with respect to one another as to provide a channel between said first and second rings within which plumb bob string is confined when wound about said bridge means.

6. The holder of claim 5 wherein said first and second annular rings each has a circular exterior circumference that tangentially blends into said bridge straight edge and that tangentially blends into a linear side wall for said channel so that said channel is defined by parallel side walls that are perpendicular to said bridge straight edge.

7. The holder of claim 5 wherein said bridge includes an interior edge laterally offset from said longitudinal axis so as to be eccentric to the longitudinally-aligned centers of said apertures and closely spaced to said bridge exterior edge so that said channel is provided with a substantial plumb bob string holding depth between said longitudinal axis and said interior edge, said interior edge being provided with a protrusion extending into said channel through which a string-fastening hole extends transversely, whereby the structural strength of said bridge is unweakened by the presence of said hole.

8. The holder of claim 5 wherein said first and second annular rings each has a circular exterior circumference that tangentially blends into said bridge straight. edge and that tangentially blends into a linear side wall for said channel so that said channel is defined by parallel side walls that are perpendicular to said bridge straight edge; and wherein said bridge includes an interior edge laterally offset from said longitudinal axis so as to be eccentric to the longitudinally-aligned centers of said apertures and closely spaced to said bridge exterior edge so that said channel is provided with a substantial plumb bob string holding depth between said longitudinal axis and said interior edge, said interior edge being provided with a protrusion extending into said channel through which a string-fastening hole extends transversely, whereby the structural strength of said bridge is unweakened by the presence of said hole.

* * * * *